United States Patent [19]
d'Auria et al.

[11] 4,147,403
[45] Apr. 3, 1979

[54] POSITIONING SUBSTRATE FOR OPTICAL FIBRES

[75] Inventors: Luigi d'Auria; André Jacques; Chantal Moronvalle, all of Paris, France

[73] Assignee: Thomson-CSF, Paris, France

[21] Appl. No.: 835,209

[22] Filed: Sep. 21, 1977

[30] Foreign Application Priority Data

Sep. 24, 1976 [FR] France ................ 76 28767

[51] Int. Cl.² .................................. G02B 5/14
[52] U.S. Cl. .................. 350/96.18; 248/347; 269/54.5; 350/96.17; 356/256
[58] Field of Search .......... 33/1 L, 174 H, 174 Q, 33/286, 299, DIG. 21; 108/28, 29; 248/347, 354 P; 350/96.10, 96.15, 96.17, 96.18, 321, 96.20; 46/1 A, 27, 28, 29; 285/5, 23, 24, 27; 144/286 A, 286 R, 253 R, 253 C; 356/256; 269/9, 10, 43, 44, 54.4, 54.5

[56] References Cited
U.S. PATENT DOCUMENTS

| 2,637,358 | 5/1953 | Larson | 144/286 R |
| 3,760,297 | 9/1973 | Thompson | 350/96.15 X |

OTHER PUBLICATIONS

Weidel, "New Coupling Method for GaAs Laser-Fibre Coupling," Elec. Letters, vol. 11, No. 18, pp. 436-437, Sep. 1975.

Primary Examiner—John K. Corbin
Assistant Examiner—John D. Lee
Attorney, Agent, or Firm—Cushman, Darby & Cushman

[57] ABSTRACT

The invention provides a substrate for positioning the end of one or more optical fibres in a reference plane. Each fibre is positioned by means of three right circular cylindrical dowels in a staggered arrangement on the flat trued face of a parallelepiped. The substrate may further comprise a single additional optical fiber bearing against the apertures of the transmission fibres and doing duty as a cylindrical lens for coupling each transmission fibre with the emissive zone of a laser diode.

7 Claims, 6 Drawing Figures

U.S. Patent  Apr. 3, 1979  Sheet 2 of 2  4,147,403
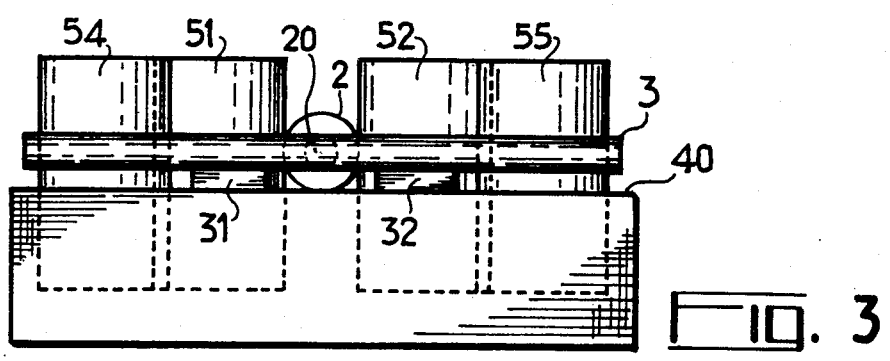
FIG. 3
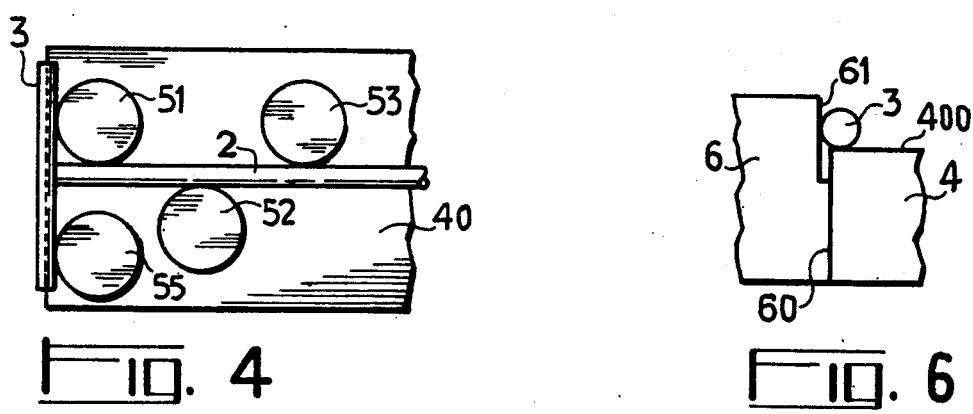
FIG. 4
FIG. 6
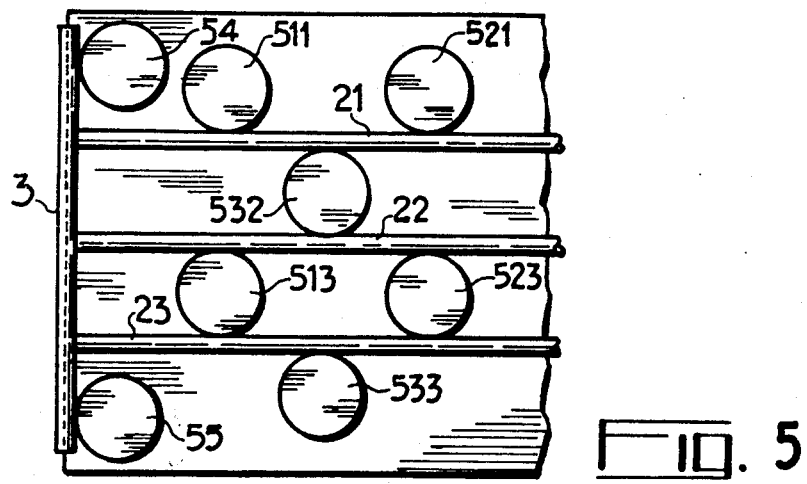
FIG. 5

POSITIONING SUBSTRATE FOR OPTICAL FIBRES

FIELD OF THE INVENTION

The present invention relates to a positioning substrate for optical fibres and more precisely to a substrate intended to resolve the problem of positioning the aperture of an optical fibre vis-a-vis a coherent light source constituted by a semiconductor laser.

BACKGROUND OF THE INVENTION

Those skilled in the art will be aware that the emissive zone of a laser diode, which zone is constituted by the junction of this diode, is very narrow (of the order of 1 micron only) in the direction perpendicular to the junction and much wider (between 15 and 20 microns) in the junction direction. The coupling of a single optical fibre whose typical diameter is in the order of 100 microns, to a light source of this kind thus depends in a very critical way upon the positioning of the source in relation to the diode, considered in the direction perpendicular to the plane of the junction.

In addition, because of the small thickness of the source, the emitted light beam is highly divergent (around 60°) in the plane perpendicular to the plane of the junction and, in the case of direct coupling between the laser and the fibre aperture, a large proportion of the emitted rays are outside the maximum input angle of incidence so that the coupling efficiency is poor. To improve this efficiency, it has been proposed either to design the aperture of the fibre in such a fashion that it has a hemispherical surface doing duty as a lens or to arrange between the transmission fibre and the diode, a second fibre perpendicular to the first and parallel to the plane of the junction, the function of which second fibre is to act as a cylindrical lens (there is no focussing problem in the plane parallel to the junction, this being the direction in which the beam has low divergence, since the source is much longer than it is wide). In this latter case, the problem arises of the strict positioning of the two fibres in relation to one another.

SUMMARY OF THE INVENTION

The invention proposes to define the position of the transmitting fibre precisely, by arranging it upon the perfectly true face of a parallelepiped of known thickness and by orientating it upon said face perpendicularly to one edge of the parallelepiped by the use of three cylindrical dowels of circular cross section whose axes are perpendicular to said face. By fixing the emissive diode to a shim of appropriate thickness, the junction is thus positioned to the right height in relation to the fibre aperture without need for manual adjustment. In the situation where the coupling between fibre and diode is effected using a cylindrical fibre lens, the invention likewise proposes that this fibre be orientated on the surface of the parallelepiped parallel to the edge, by the use of one or two additional dowels identical to the first three.

It should be emphasized that the orientation of the fibres by a system of dowels avoids the need for the delicate operations of machining positioning grooves and provides better definition of the plane upon which the fibre or fibres is or are resting.

BRIEF DESCRIPTION OF THE DRAWING

This invention together with its features, advantages and objects, can be better understood from the ensuing detailed description, when read in conjunction with the attached drawings in which:

FIG. 3 illustrates a positioning substrate in accordance with the invention, in which a coupling fibre rests upon the reference plane through the medium of two shims;

FIG. 4 illustrates a variant embodiment of the positioning substrate in accordance with the invention as shown in FIG. 2;

FIG. 5 illustrates a positioning substrate in accordance with the invention, comprising several transmission fibres associated with a single coupling fibre;

FIG. 6 illustrates a device in accordance with the invention for arranging a coupling fibre on the positioning substrate.

DETAILED DESCRIPTION OF THE PREFERRED EMBODIMENTS

Figure 1:
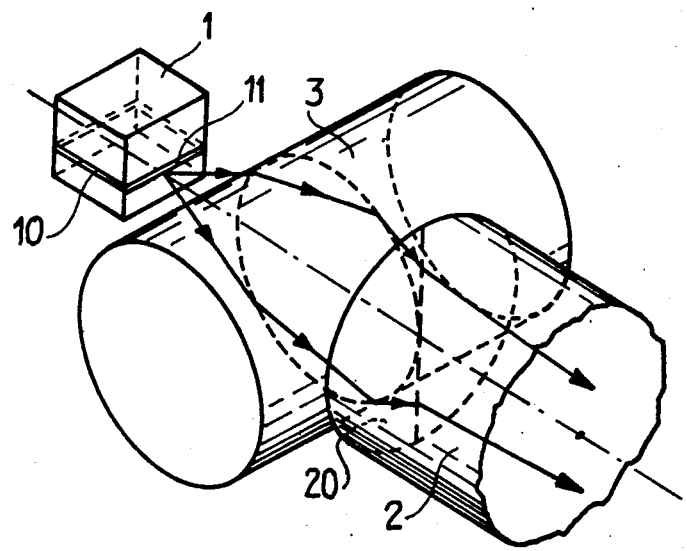
FIG. 1 is an explanatory figure pertaining to the prior art.

FIG. 1 is an explanatory diagram illustrating, in accordance with the prior art, a laser diode 1 with its junction 10 and the zone 11 emitting coherent light, an optical transmission fibre 2 whose flat aperture is designed to pick up the radiation emitted by the diode 1, and an optical coupling fibre 3 identical to the former and arranged between the emissive zone 11 and the aperture 20 in order to do duty as a cylindrical coupling lens. The junction 10 and the axes of the fibres 2 and 3 which are perpendicular to one another, are located in the same plane. In FIG. 1, two symmetrical rays located furthest away from the axis have been used to illustrate the trajectory of the rays emitted from the diode in a plane passing through the axis of the fibre 2 and perpendicular to the plane of the junction; because of the small thickness of the junction, the angle made by these rays with the axis is substantial and may reach as much as 60°; if they enter the fibre 2 at this angle of incidence, then they are unable to propagate therein. As the figure shows, the lens effect of the fibre 3 gives these rays a direction much closer to that of the axis of the transmission fibre, so that they can therefore propagate through the latter; the lens thus achieves optimum coupling between the transmission fibre and the source. However, it is clear that this coupling effect diminishes rapidly as one moves further away from the ideal conditions shown in FIG. 1 and in particular when the plane of the junction 11 ceases to contain the axis of the fibre 2 or when the axes of the fibres 2 and 3 cease to be coplanar.

Figure 2:
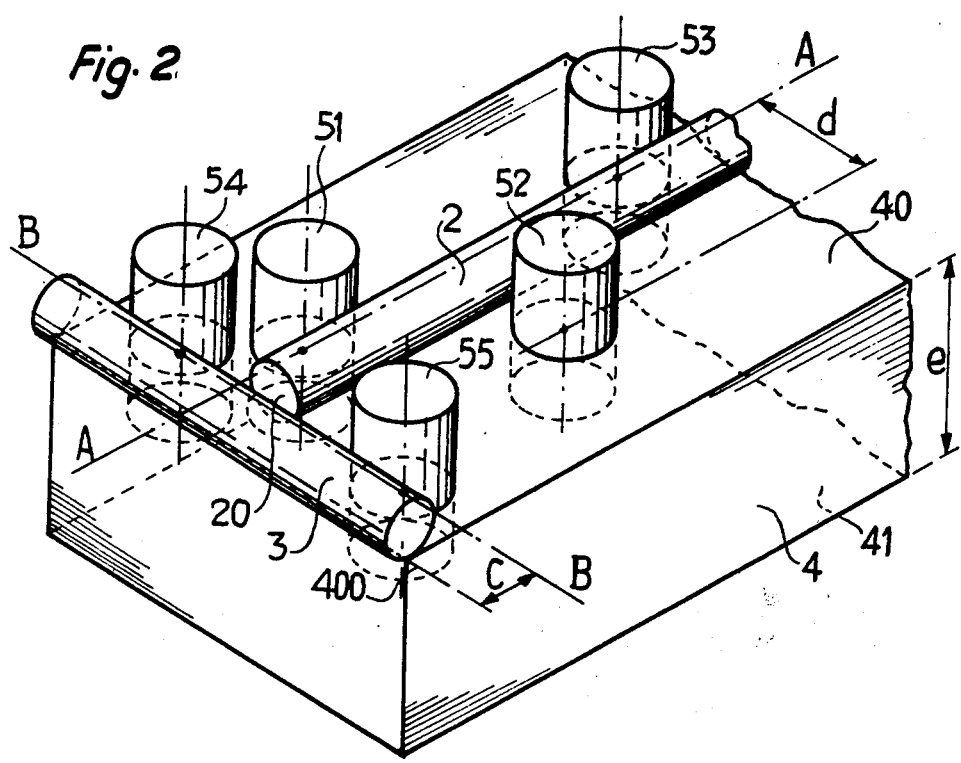
FIG. 2 illustrates a positioning substrate in accordance with the invention, comprising a single transmission fibre and a coupling fibre.

FIG. 2 illustrates an example of a positioning substrate for a single optical fibre, in accordance with the invention.

This substrate is constituted by a metal parallelepiped 4 two opposite faces of which, 40 and 41, are strictly parallel; the face 40 doing duty as reference face is furthermore trued accurately and the distance e separating the two faces defined with high accuracy.

Three identical positioning dowels 51, 52, and 53 are arranged on the reference face 40; they are constituted by cylindrical rods of right circular section whose axes are perpendicular to the face 40. The diameters of these three rods are of the order of one millimeter and are equal to one another to within one micron. The intersection between the axes of the dowels 51 and 52 (which are a few millimeters apart) and the plane 40, defines a straight line AA strictly perpendicular to an edge 400 of the parallelepiped substrate. The axis of the dowel 52 is at an interval from this straight line AA of $d = d_1 + d_2$, $d_1$ and $d_2$ being the respective diameters of the rods and of the fibre 2. The dowels 51 and 53 on the one hand and dowel 52 on the other, thus define between themselves a channel perpendicular to the edge 400, whose width is equal to the diameter $d_2$ of the transmission fibre 2, namely 110 microns. FIG. 2 illustrates the fibre 2 in position, resting upon the plane 40 and tangenting these three dowels. It is fixed to the substrate 4 by two drops of adhesive (not shown in the figure). The dowels 51, 52 and 53 are cut from standard accurately sized rods, for example of hardened steel, which may be sized "Nadella" (registered trade mark) rods or hardened steel rods used in needle roller bearings. They have a length of around 2 mm and are inserted for half their length into drillings formed in the face 40; the positional tolerances on these drillings are of the order conventionally obtained using a jig-borer.

FIG. 2 also illustrates an optical fibre 3 of the same diameter as fibre 2, arranged upon the face 40 of the substrate 4 along the edge 400, perpendicularly to the fibre 2 and resting against the flat aperture 20 of the latter; the fibre 3 thus acts as a cylindrical coupling lens in the manner explained earlier as illustrated in FIG. 1.

The positioning of the coupling fibre 3 is achieved by two other positioning dowels 54 and 55, identical to the ones referred to earlier and attached to the substrate 4 in the same fashion. The intersection between the axes of the dowels 54 and 55 and the plane 40, defines a straight line BB strictly parallel to the edge 400 and located at an interval c therefrom such that:

$$(d_1 + d_2)/2 < c \leq (d_1/2) + d_2$$

In order to facilitate the introduction into position of the laser diode which must be capable of being moved up very close to the coupling fibre 3, it is preferable that the latter should slightly overlap the front face of the substrate 4, in the manner shown in FIG. 2.

In the situation in which a transmission fibre and a coupling fibre are arranged upon the substrate, the coupling fibre is placed in position first of all and stuck down using two drops of adhesive at its ends, in such a fashion that it bears against the reference face 40 and the two dowels 54 and 55. The transmission fibre, bearing against the same face 40 and guided by the three dowels 51, 52, and 53, is moved up until it abuts against the coupling fibre 3 and is then stuck to the substrate in the manner described earlier. A drop of a transparent liquid having a refractive index close to that of the material of which the two fibres are made, can be arranged between the fibre doing duty as coupling lens and the aperture of the transmission fibre.

The device shown in FIG. 2 thus makes it possible:

on the one hand in the case where the coupling and transmission fibres have the same diameter, to arrange the axes of these fibres to be strictly in the same plane and perpendicular to one another;

on the other hand to define with high accuracy the position of the common plane containing the two axes; the laser diode being arranged upon a substrate of adequate thickness to ensure that the emissive junction is located in this same plane, there being consequently no need to make any height adjustment of the source in relation to the emission fibre, adjustment which is as a matter of fact by far the most critical.

If the transmission fibre has a larger diameter than that of the lens fibre, this being the case which arises for example if the cladding of the transmission fibre is very thick, it is then possible to raise the lens fibre in relation to the reference plane by placing it upon shims. FIG. 3 illustrates a frontal view of the positioning substrate in which, specifically, two shims 31 and 32 have been arranged between the positioning dowels 54 and 55 to either side of the aperture 20 of the transmission fibre 2 in order to raise the lens fibre 3 in relation to the reference surface 40 so that the axes of the two fibres 2 and 3 remain coplanar despite the differences in their diameters.

FIG. 4, illustrates by means of a plan view of the substrate an arrangement of the positioning dowels which differs from that shown in FIG. 1; this kind of arrangement can be used if the substrate is to simultaneously carry a transmission fibre and a coupling fibre. The dowel 54 of FIG. 2 is discarded, the dowel 51 serving here, jointly with those 52 and 53 to position the transmission fibre 2, and jointly with that 55, to position the lens fibre 3. This arrangement economizes on one dowel but on the other hand means that the location of the dowel 51 is a much more critical operation since the position of its axis must be defined accurately in two mutually perpendicular directions contained within the reference surface 40.

FIG. 5 illustrates a plan view of a positioning substrate in accordance with the invention, used for the parallel arrangement of three transmission fibres 21, 22 and 23 perpendicularly to the axis of a common coupling fibre 3 which enables coupling to take place to as many laser diodes as there are transmission fibres. The positioning dowels 54, 55 define the position of the fibre 3. The dowels 532, in association with those 513 and 523 defines the position of the fibre 22; similarly, the dowels 513 and 523 are associated with that 533 in order to define the position of the fibre 23. The interval between the transmission fibres aligned in parallel on the substrate, is thus fixed by the diameter of the dowels. One and the same substrate can therefore be used to arrange a large number of transmission fibres in parallel, using a single coupling fibre lens. The assembly of the fibres on the substrate is performed in the same way as in the situation where there is only one transmission fibre, the coupling fibre being first of all placed in position and then stuck to the substrate, and the transmission fibres then being arranged so that their apertures abut against the coupling fibre.

FIG. 6 relates to another method of positioning the coupling fibre 3 which method makes it possible to discard the positioning dowels 54 and 55 shown in FIGS. 2, 3 and 5. A parallelepiped block 6 is arranged in abutment against the front face of the parallelepiped block constituting the substrate 4. In the case where it is desired that the coupling fibre should slightly overlap the front face of the substrate 4, the front face 60 of the block 6 can have a slightly recessed top part 61, the depth of this recess being at the most equal to the radius of the coupling fibre 3. The coupling fibre 3 is then arranged in abutment against the faces 400 of the block 4 and 61 of the block 6 and stuck to the face 400 by two drops of adhesive. The transmission fibre or fibres is or are then brought up into abutment with the coupling fibre.

What we claim is:

1. A positioning substrate for arranging the end of at least one optical transmission fibre in a reference plane and in parallel orientation to a given direction of said plane, comprising a flat surface for defining said reference plane, and at least three positioning dowels for defining said direction; said dowels having the form of cylinders of circular cross-section and of axes perpendicular to said flat surface; a first, a second and a third generatrix of said transmission fibre being respectively in contact with said flat surface, two of said dowels and a third of said dowels, said second and third generatrices being diametrically opposite.

2. A substrate as claimed in claim 1, further comprising an optical coupling fibre, said fibre bearing against the aperture of said transmission fibre and being located perpendicularly to said given direction.

3. A substrate as claimed in claim 2, wherein said coupling fibre is arranged along an edge of said substrate, said edge delimiting said flat surface.

4. A substrate as claimed in claim 2, wherein a generatrix of said coupling fibre is in contact with said flat surface.

5. A substrate as claimed in claim 2, wherein said coupling fibre rests upon said flat surface through the medium of two shims arranged to either side of the end of said transmission fibre.

6. A substrate as claimed in claim 2, wherein said coupling fibre bears with one of its generatrices against two of said positioning dowels.

7. A substrate as claimed in claim 1, further comprising a second flat surface parallel to the first.

* * * * *